US010521184B2

(12) United States Patent
Stancil et al.

(10) Patent No.: US 10,521,184 B2
(45) Date of Patent: Dec. 31, 2019

(54) AUDIO PROFILE CONFIGURATIONS

(71) Applicant: HEWLETT-PACKARD DEVELOPMENT COMPANY, L.P., Houston, TX (US)

(72) Inventors: Charles J Stancil, Houston, TX (US); Nimish Ghatalia, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,887

(22) PCT Filed: Jul. 29, 2016

(86) PCT No.: PCT/US2016/044620
§ 371 (c)(1),
(2) Date: Oct. 11, 2018

(87) PCT Pub. No.: WO2018/022074
PCT Pub. Date: Feb. 1, 2018

(65) Prior Publication Data
US 2019/0138264 A1 May 9, 2019

(51) Int. Cl.
G06F 17/00 (2019.01)
G06F 3/16 (2006.01)
(52) U.S. Cl.
CPC .................... G06F 3/165 (2013.01)
(58) Field of Classification Search
CPC .......... G06F 3/165; G06F 9/44; G06F 9/4411; G06F 13/10
See application file for complete search history.

(56) References Cited

U.S. PATENT DOCUMENTS

| 8,180,078 | B2 | 5/2012 | Zellner |
| 2009/0011794 | A1 | 1/2009 | Seo |
| 2009/0091655 | A1 | 4/2009 | Russell et al. |
| 2010/0323621 | A1 | 12/2010 | Slamka et al. |
| 2015/0098597 | A1 | 4/2015 | Kulavik |
| 2015/0264513 | A1 | 9/2015 | Ryazanov |
| 2015/0280678 | A1 | 10/2015 | Teh et al. |
| 2016/0014172 | A1 | 1/2016 | Van De Laar et al. |
| 2017/0300289 | A1* | 10/2017 | Gattis ................... G10L 19/018 |

FOREIGN PATENT DOCUMENTS

JP 2002171204 A 6/2002

OTHER PUBLICATIONS

USB2.0 High-Speed stereo HD Audio Controller (24bit/192KHz)(companion is CM9822A), Jan. 5, 2010.

* cited by examiner

Primary Examiner — Joseph Saunders, Jr.
(74) Attorney, Agent, or Firm — Brooks, Cameron & Heubsch PLLC

(57) ABSTRACT

Examples of the present disclosure can include a computing device comprising a detection engine to detect whether an audio setup of an external audio device is supported. The computing device can include an audio profile engine to, in response to detection that the audio setup is supported, provide an audio profile for use by the external audio device. Examples of the present disclosure can include an external audio device coupled to the computing device.

13 Claims, 3 Drawing Sheets

AUDIO PROFILE CONFIGURATIONS

BACKGROUND

Computing devices (e.g., laptops, smartphones, desktops, personal computing devices, etc.) can be used to play audio. Additional external audio devices can be used to play audio from the computing devices. The computing devices may have internal parameters for playing the audio on the computing devices.

DETAILED DESCRIPTION

Computing devices, particularly mobile ones, can include audio systems that have been improving in quality. The audio systems of the computing devices can be used in a number of settings. For example, audio can be listened to in a business setting, such as in a cubicle, and can include using an audio system that is private for the user of the computing device. That is, the user can listen to audio on external audio devices that include headsets, wireless Bluetooth devices, external audio speaker systems, etc.

The external audio devices can be coupled to the computing devices using a number of methods. For example, the external audio devices can be coupled to the computing device using an analog connector. The external audio devices can be coupled to the computing device using a Universal Serial Bus (USB) port connector.

When an external audio device (such as a USB coupled audio device) includes an audio codec within the external audio device, an audio codec that is internal to the computing device may be bypassed. An audio codec refers to a device and/or computer application for encoding and decoding a digital data stream and/or signal. An audio codec can include a Digital Signal Processor (DSP). A DSP can refer to a specialized microprocessor with an architecture for operational needs of digital signal processing. A DSP can measure, filter, and/or compress continuous real-world signals (e.g., such as analog signals). A codec can encode a data stream or signal for transmission, storage or encryption, or decode the data for playback and/or editing. Codecs can be used in videoconferencing, streaming media, and/or video editing. In addition, some audio parameters that are recognized using an analog port connection may not be recognized using a USB connection and/or additional connections where the codec resides on the external audio device.

An audio profile system on the computing device that provides an audio profile associated with a particular codec can be useful in improving audio quality. If the audio profile provided is bypassed by an external audio device, the improved audio quality may not be realized by the external audio device. For example, an audio profile system can recognize that music audio is being played on an external device and provide an audio profile to play the music audio. If the external audio device bypasses the provided audio profile, a default profile may be used and the music audio will not be played with the optimized audio profile.

Providing a computing system to allow an external audio device to avoid bypassing the provided audio profile can be useful. If an external audio device with an internal codec is recognized, the computing device can insure that the external audio device is using the provided audio profile and prevent bypassing of the audio profile.

Figure 1:
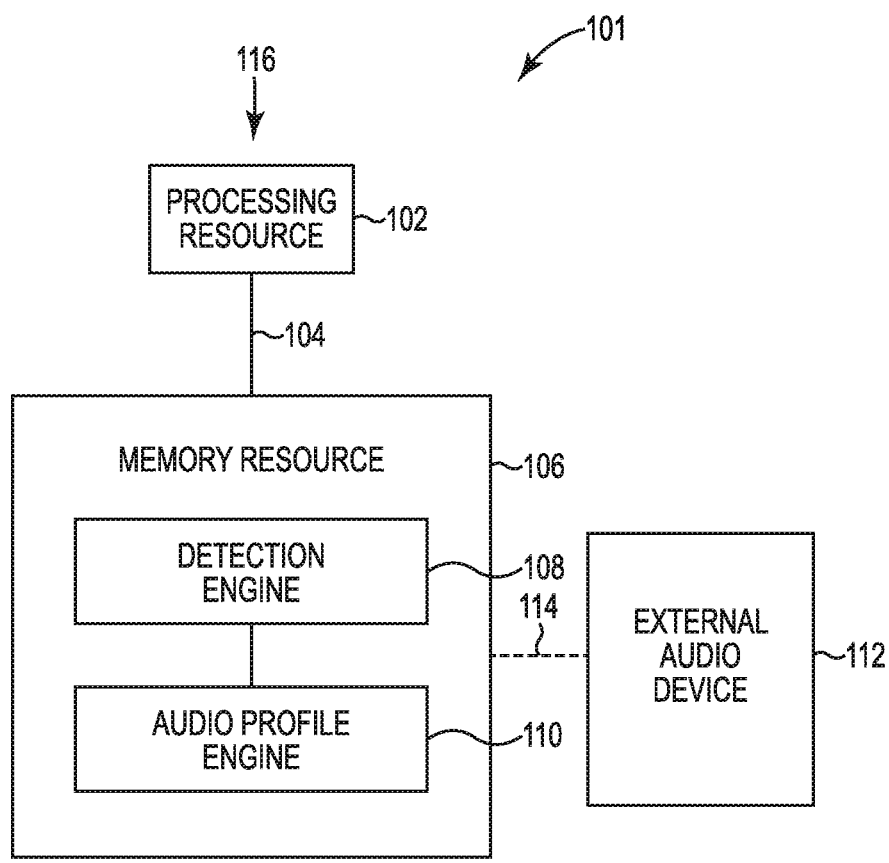
FIG. 1 illustrates a diagram of an example of a system for audio profile configurations consistent with the disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense FIG. 1 illustrates a diagram of an example of a system 101 for audio profile configurations consistent with the present disclosure. The system 101 can include a computing device 116 that includes a processing resource 102 and a memory resource 106. The system can include an external audio device 112 coupled, at 114, to the computing device 116. The computing device 116 can utilize software/hardware (e.g., machine-readable instructions), or logic to perform functions described herein.

The computing device 116 can be any combination of hardware and program instructions configured to process information. The hardware, for example, can include a processing resource 102 or a memory resource 106 (e.g., computer-readable medium (CRM), machine readable medium (MRM), database, etc.). A processing resource 102, as used herein, can include any set of processors capable of executing instructions stored by a memory resource 106. Processing resource 102 may be implemented in a single device or distributed across multiple devices.

The program instructions (e.g., computer readable instructions (CRI), machine readable instructions (MRI, etc.) can include instructions stored on the memory resource 106 and executable by the processing resource 102 to implement a function (e.g., detect whether an audio setup of an external audio device is supported, provide an audio profile for use by the external audio device in response to detection that the audio setup is supported, etc.).

The memory resource 106 can be in communication with a processing resource 102. A memory resource 106, as used herein, can include any set of memory components capable of storing instructions that can be executed by processing resource 102. Such memory resource 106 can be a non-transitory CRM or MRM. Memory resource 106 may be integrated in a single device or distributed across multiple devices. Further, memory resource 106 may be fully or partially integrated in the same device as processing resource 102 or it may be separate but accessible to that device and processing resource 102. Thus, it is noted that the computing device 116 may be implemented on a remote device.

The memory resource 106 can be in communication with the processing resource 102 via a communication link (e.g., a path) 104. The communication link 104 can be local or remote to a machine (e.g., a computing device) associated with the processing resource 102. Examples of a communication link 104 can include an electronic bus internal to a machine (e.g., a computing device) where the memory resource 106 is one of volatile, non-volatile, fixed, or removable storage medium in communication with the processing resource 102 via the electronic bus.

A set of engines (e.g., detection engine 108, audio profile engine 110) can include CRI that when executed by the processing resource 102 can perform functions. The set of engines (e.g., detection engine 108, audio profile engine 110) can be sub-engines of other engines. For example, the detection engine 108 and the audio profile engine 110 can be sub-engines or contained within the same computing device. In another example, the set of engines (e.g., detection engine 108, audio profile engine 110) can comprise individual engines at separate and distinct locations (e.g., CRM, etc.).

A detection engine 108 can include hardware and/or a combination of hardware and programming to detect whether an audio setup of an external audio device is supported. The audio setup can include a particular codec that is being used by the external audio device. The computing device 116 may support the particular codec or may not support the particular codec. In some examples, the external audio device is coupled to the computing device using a USB connection.

An audio profile engine 110 can include hardware and/or a combination of hardware and programming to, in response to detection that the audio setup is supported, provide an audio profile for use by the external audio device. The audio profile provided can correspond to a type of audio being played (e.g., music audio, movie audio, game audio, spoken word audio, conference call audio, etc.). The audio profile can affect parameters of audio input used to play the audio on the external audio device. For example, parameters can include bass, treble, filtering of the audios, etc.

In some examples, a plurality of modules may include instructions that when executed by the processing resource 102 may function as engines such as the engines described in connection with FIG. 1 above. For example, a detection module may include instructions that when executed by the processing resource 102 may function as the detection engine 108 shown in FIG. 1. An audio profile module may include instructions that when executed by the processing resource 102 may function as the audio profile engine 110 shown in FIG. 1.

Examples are not limited to the example engines shown in FIG. 1 and in some cases a number of engines may operate together to function as a particular engine. Further, the engines and/or modules of FIG. 1 may be located in a single system and/or computing device or reside in separate distinct locations in a distributed network, cloud computing, enterprise service environment (e.g., Software as a Service (SaaS) environment), etc.

Figure 2:
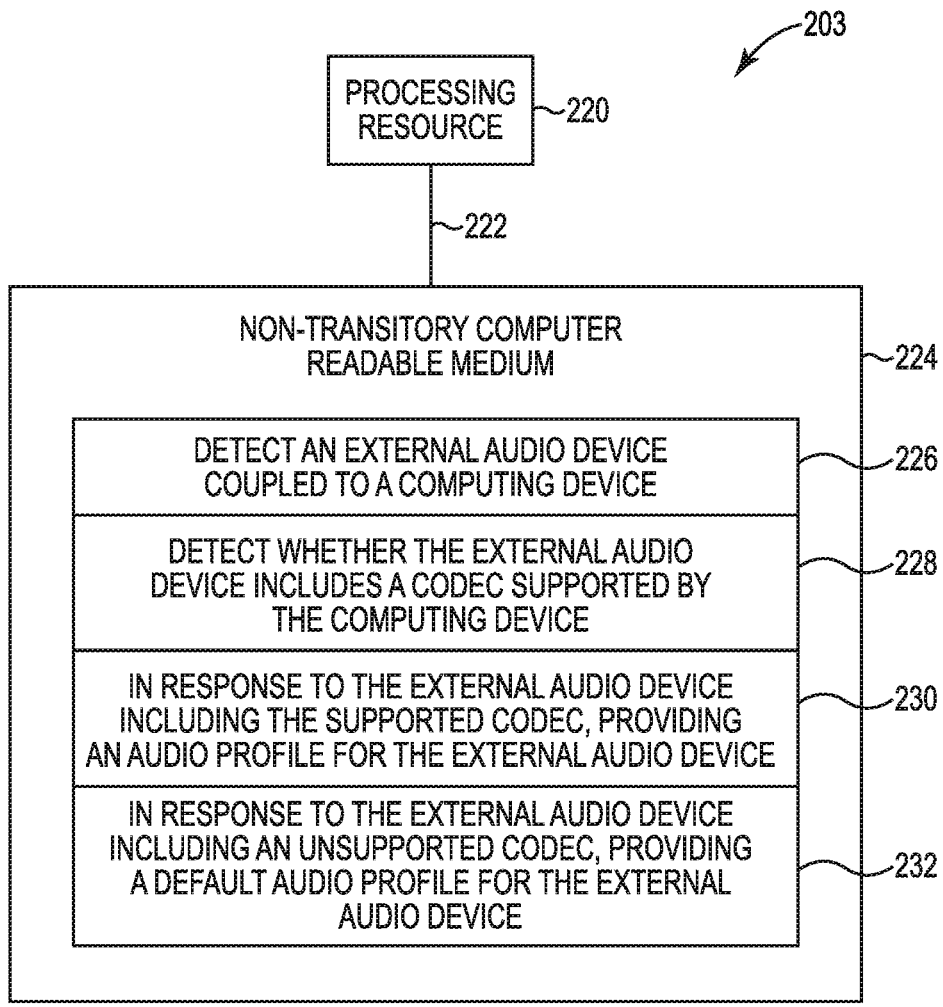
FIG. 2 illustrates a diagram of an example computing device consistent with the disclosure.

FIG. 2 illustrates a diagram of an example system 203 including a processing resource 220 and non-transitory computer readable medium 224 according to the present disclosure. For example, the system 203 may be an implementation of the example system of FIG. 1 and/or the example computing device of FIG. 1. The processing resource 220 can be coupled to the non-transitory machine readable medium via connection 222.

The processing resource 220 may execute instructions stored on the non-transitory computer readable medium 224. For example, the non-transitory computer readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 220 to detect an external audio device coupled to a computing device. For example, an external audio device (e.g., 112 in FIG. 1) can be coupled to a computing device (e.g., computing device 116 in FIG. 1) and can be detected by the computing device. The instructions 226 can be executable to detect when the external audio device is coupled to the computing device.

The example medium 224 may further store instructions 228. The instructions 228 may be executable to detect whether the external audio device includes a codec supported by the computing device. For example, an external audio device can include its own codec for encoding and decoding data streams and can use this codec for playing music on the external audio device. In some examples, the external audio device may bypass a codec internal to the computing device and use a default audio profile on the computing device for playing the music on the external audio device.

The example medium 224 may further store instructions 230. The instructions 230 may be executable to, in response to the external audio device including the supported CODEC, providing an audio profile for the external audio device. For example, when the computing device detects that the external audio device includes a codec that the computing device supports, the computing device can provide a particular audio profile for playing audio on the external audio device. In some examples, the computing device may be playing music audio and have a first audio profile for playing music audio.

The computing device can provide the first audio profile to the external audio device to play the music audio. The computing device may have a second audio profile for implementing a conferencing call amongst a group of users. The computing device can provide the second audio profile for use by the external audio device when implementing a conference call. In some examples, the computing device can detect a change in the type of audio and switch from providing the first audio profile to providing the second audio profile. However, examples are not so limited and any type of audio profile can be switched to any other type of audio profile.

The example medium 224 may further store instructions 232 executable by the processing resource 220 to, in response to the external audio device including an unsupported codec, providing a default audio profile for the external audio device. For example, when the computing device detects that there is a codec internal to the external audio device but that it is an unsupported codec, the computing device can provide a default audio profile to the external audio device. Therefore, regardless of the type of audio being played on the external audio device, the audio profile would remain the same.

Figure 3:
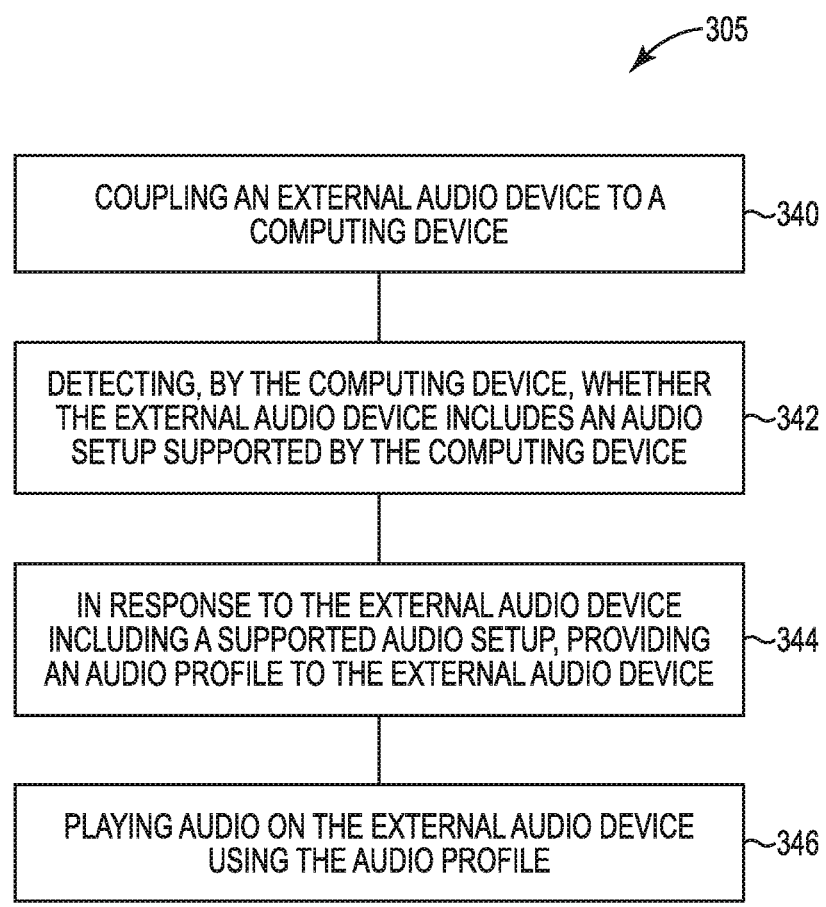
FIG. 3 illustrates a flow diagram for an example method for audio profile configurations consistent with the disclosure.

FIG. 3 illustrates a flow diagram for an example method 305 according to the disclosure. In various examples, the method 305 may be performed using the system 101 shown in FIG. 1 and/or the system 203 and engines shown in FIG. 2. Examples are not, however, limited to these example systems, devices, engines, and/or modules.

At 340, the method 305 can include coupling an external audio device to a computing device. For example, a headset can be coupled to a desktop computer. A Bluetooth wireless ear piece can be coupled to a laptop computer, etc. In some examples, a base station can be coupled to the computing device and the base station can wirelessly communicate with an audio piece (e.g., an ear piece, a headphone, etc.). The coupling of the external audio device to the computing device can be detected.

At 342, the method 305 can include detecting, by the computing device, whether the external audio device includes an audio setup supported by the computing device.

The audio setup can include a particular codec used by the external audio device to encode and decode audio data streams.

At 344, the method 305 can include, in response to the external audio device including a supported audio setup, providing an audio profile to the external audio device. For example, detection of an audio setup including a particular codec that is supported by the computing device, the computing device can provide an audio profile that corresponds to the type of audio being played on the external audio device.

At 346, the method 305 can include playing audio on the external audio device using the audio profile. For example, the computing device can be implementing a conference call using the external audio device. The computing device can provide an audio profile that optimizes the conference call to the external audio device and the external audio device can play and/or record audio using the provided audio profile. In addition, the external audio device can record audio using the provided audio profile.

In response to the computing device detecting that the external audio device include an audio setup that is not supported by the computing device, the computing device can provide a default audio profile. For example, the external audio device would play all audio using the same default audio profile and would not optimize the audio being played if the audio setup was not supported.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 203 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, for example, various forms of transistor logic, application specific integrated circuits (ASICs), etc., as opposed to computer executable instructions, for example, software firmware, etc., stored in memory and executable by a processor.

What is claimed:

1. A system, comprising:
   a processor; and
   a non-transitory machine-readable storage medium to store instructions executable by the processor to:
   detect whether a codec of an external audio device, coupled to a computing device, is supported by the computing device;
   in response to a detection that the codec is supported by the computing device, provide an audio profile for use by the external audio device, wherein the audio profile to be provided is determined based on a type of audio to be played by the computing device on the external audio device; and
   in response to a detection that the codec is not supported by the computing device, bypassing a codec internal to the computing device and providing a default audio profile for use by the external audio device.

2. The system of claim 1, wherein the external audio device is coupled to the computing device using a Universal Serial Bus (USB) port connection.

3. The system of claim 1, wherein the audio profile specifies audio parameters to be utilized to play the audio on the external audio device.

4. The system of claim 3, wherein the specified audio parameters include tone settings to be utilized to play the audio on the external audio device.

5. A method, comprising:
   coupling an external audio device to a computing device;
   detecting, by the computing device, whether the external audio device includes a codec supported by the computing device;
   in response to the external audio device including a supported codec:
      providing, to the external audio device, an audio profile to be utilized to play audio at the external audio device, wherein the audio profile is selected based on a type of the audio to be played by the computing device on the external audio device, and
      playing audio on the external audio device using the audio profile; and
   in response to the external audio device including an unsupported codec, bypassing a codec internal to the computing device and providing a default audio profile for use by the external audio device.

6. The method of claim 5, comprising recording audio using the audio profile on the external audio device.

7. The method of claim 5, wherein the audio profile specifies audio parameters to be utilized to play the audio on the external audio device.

8. The method of claim 5, wherein:
   coupling the external audio device to the computing device comprises coupling a station associated with the external audio device to the computing device; and
   the station and the computing device communicate wirelessly.

9. A non-transitory computer readable medium storing instructions executable by a processing resource to:
   detect an external audio device coupled to a computing device;
   detect whether the external audio device includes a codec supported by the computing device;
   in response to the external audio device including the supported codec, providing an audio profile for the external audio device, wherein the audio profile to be provided is determined based on a type of audio to be played on the external audio device; and
   in response to the external audio device including an unsupported codec, bypassing an internal codec of the computing device and providing a default audio profile for the external audio device.

10. The non-transitory computer readable medium of claim 9, wherein the instructions are executable by the processing resource to use the audio profile on the external audio device independent of whether the external audio device is coupled to the computing device using an analog connection or Universal Serial Bus (USB) ports.

11. The non-transitory computer readable medium of claim 9, wherein the instructions are executable by the processing resource to provide an audio profile that specifies an audio parameter corresponding to the type of audio being played.

12. The non-transitory computer readable medium of claim 9, wherein the type of audio includes at least one of:
   movie audio;
   music audio;
   spoken word audio; and
   conferencing audio.

13. The non-transitory computer readable medium of claim 9, wherein the instructions are executable by the processing resource to switch from a first audio profile to a second audio profile in response to switching the type of audio being played.

* * * * *

UNITED STATES PATENT AND TRADEMARK OFFICE
CERTIFICATE OF CORRECTION

PATENT NO. : 10,521,184 B2
APPLICATION NO. : 16/092887
DATED : December 31, 2019
INVENTOR(S) : Charles J Stancil et al.

It is certified that error appears in the above-identified patent and that said Letters Patent is hereby corrected as shown below:

On the Title Page

In Column 2, item (74), Attorney, Agent, or Firm, Line 2, delete "Heubsch" and insert -- Huebsch --, therefor.

Signed and Sealed this
Third Day of March, 2020

Andrei Iancu
*Director of the United States Patent and Trademark Office*